United States Patent
Dorato et al.

(10) Patent No.: US 10,428,206 B2
(45) Date of Patent: *Oct. 1, 2019

(54) PROCESS FOR THE CONTINUOUS SYNTHESIS OF A MODIFIED DIENE ELASTOMER

(71) Applicant: COMPAGNIE GENERALE DES ETABLISSEMENTS MICHELIN, Clermont-Ferrand (FR)

(72) Inventors: Margarita Dorato, Clermont-Ferrand (FR); Lionel Flesinski, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/741,118

(22) PCT Filed: Jun. 30, 2016

(86) PCT No.: PCT/EP2016/065441
§ 371 (c)(1),
(2) Date: Dec. 29, 2017

(87) PCT Pub. No.: WO2017/001637
PCT Pub. Date: Jan. 5, 2017

(65) Prior Publication Data
US 2018/0346693 A1   Dec. 6, 2018

(30) Foreign Application Priority Data

Jul. 2, 2015   (FR) ...................... 15 56254

(51) Int. Cl.
*C08L 9/06* (2006.01)
*C08C 19/25* (2006.01)
*C08C 19/44* (2006.01)
*C08F 236/10* (2006.01)
*C08F 2/01* (2006.01)
*C08F 212/08* (2006.01)
*C08L 83/04* (2006.01)
*C08F 2/00* (2006.01)
*C08F 4/48* (2006.01)

(52) U.S. Cl.
CPC ................ *C08L 9/06* (2013.01); *C08C 19/25* (2013.01); *C08C 19/44* (2013.01); *C08F 2/001* (2013.01); *C08F 212/08* (2013.01); *C08F 236/10* (2013.01); *C08L 83/04* (2013.01); *C08F 2500/03* (2013.01); *C08F 2500/21* (2013.01)

(58) Field of Classification Search
CPC .... C08F 2/001; C08F 4/48; C08F 8/42; C08L 83/06
USPC .................................................. 525/106, 53
See application file for complete search history.

(56) References Cited

U.S. PATENT DOCUMENTS

| | | | | |
|---|---|---|---|---|
| 5,066,721 A | * | 11/1991 | Hamada | B60C 1/0016 525/102 |
| 6,013,718 A | * | 1/2000 | Cabioch | B60C 1/00 524/492 |
| 2005/0203251 A1 | * | 9/2005 | Oshima | C08C 19/44 525/192 |
| 2015/0086735 A1 | * | 3/2015 | Valenti | C08F 36/06 428/36.9 |
| 2016/0176991 A1 | | 6/2016 | Dire et al. | |
| 2018/0134830 A1 | * | 5/2018 | Dorato | C08F 2/001 |

FOREIGN PATENT DOCUMENTS

| EP | 1457501 A1 | 9/2004 |
|---|---|---|
| WO | 2014040640 A1 | 3/2014 |
| WO | 2015018599 A1 | 2/2015 |

OTHER PUBLICATIONS

International Search Report for PCT/EP2016/065441 dated Aug. 26, 2016.

* cited by examiner

*Primary Examiner* — Fred M Teskin
(74) *Attorney, Agent, or Firm* — Dickinson Wright PLLC

(57) ABSTRACT

A process for the continuous synthesis of a modified diene elastomer includes:
polymerization by n reactors r1 to rn equipped with an internal stirring system, the reactor r1 being fed by an input solution comprising a solvent, one or more monomers, an anionic polymerization initiator and a polar agent, one or more of the reactors being fed by reinjection of a purified solution comprising solvent and/or monomer(s), the number of dead chains in the output stream from the reactor rn is less than 30% of the number of living chains initiated in the reactor r1, the temperature of each reactor varying from 20° C. to 150° C.; and
modification of the living diene elastomer obtained in the preceding stage and exhibiting a polydispersity index varying from 1.1 to 2, making it possible to introduce, into the elastomer, a functional group comprising at least one silicon atom directly connected to the elastomer chain.

20 Claims, No Drawings

PROCESS FOR THE CONTINUOUS SYNTHESIS OF A MODIFIED DIENE ELASTOMER

This application is a 371 national phase entry of PCT/EP2016/065441, filed 30 Jun. 2016, which claims benefit of French Patent Application No. 1556254, filed 2 Jul. 2015, the entire contents of which are incorporated herein by reference for all purposes.

BACKGROUND

1. Technical Field

The present invention relates to a process for the continuous synthesis of a modified diene elastomer exhibiting a narrow molecular weight distribution before modification.

2. Related Art

Now that savings in fuel and the need to protect the environment have become a priority, it is desirable to produce polymers having good mechanical properties and a hysteresis which is as low as possible, in order to be able to process them in the form of rubber compositions which can be used in the manufacture of various semi-finished products participating in the constitution of tire casings and to obtain tires with improved properties, in particular having a reduced rolling resistance.

The reduction in the hysteresis of the mixtures is an ongoing objective of the tire industry in order to limit fuel consumption and to thus protect the environment. This must, however, be carried out while keeping intact the processability of the mixtures.

Many solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer, thus modified, and the filler, whether this is carbon black or a reinforcing inorganic filler.

The reduction in the distribution of the molecular weights before modification of the elastomer also makes it possible to improve the hysteresis/processing compromise of the material.

The synthesis of the elastomers with a process of batchwise type is preferable in this regard, since this type of process makes it possible to control the molecular distribution in order to obtain diene copolymers with a narrow molecular weight distribution before functionalization, unlike a continuous process, which provides a wide molecular weight distribution.

Mention may be made, by way of example, of U.S. Pat. No. 6,313,232, EP 1318172 and EP 1 829 906, which assert that products exhibiting a low polydispersity are favourable to a reduced hysteresis. Linear polymers with narrow molecular distributions exhibit in addition an improved processing.

U.S. Pat. No. 5,587,420 describes a method for the polymerization of diene monomers in solution in a hydrocarbon solvent using, as initiator, an organolithium compound, batchwise. An organotin compound or a tin halide is added during the batch. This type of of batchwise process is less productive and less economical than a continuous process. This is described in U.S. Pat. No. 6,313,232, which describes a continuous process with a first stage of polymerization in the presence of a tin-derived compound, followed by a stage of functionalization with the tin at the outlet of the reactor for production of a diene polymer with improved physical properties, including the reduction in the hysteresis. However, the polydispersity values of polymers synthesized with this method are not indicated.

Moreover, in order for it to be possible for the polymer obtained to be exploited, the synthesis process must be competitive and economical. In this sense, a process of continuous type is preferable. However, this type of process with a perfectly stirred reactor does not make it possible to control the polydispersity index like the processes of the batchwise type.

Many patents describe the synthesis of functional elastomers in a continuous process. Mention may be made of Patent JP 1988-235305 (63-235305JP), which describes an economical continuous polymerization process in which the polymer obtained has a wide molecular distribution.

The aim of the invention is thus to find an economical continuous process capable of synthesizing modified diene elastomers with a low molecular weight distribution before functionalization which makes possible a gain with regard to the hysteresis/processing compromise of the material thus synthesized.

U.S. Pat. No. 6,372,863 B1 describes a continuous process for the polymerization of styrene and butadiene in two reactors in series, according to which all of the styrene is introduced into the first reactor with only a portion of the butadiene, the remainder of the butadiene being introduced into the second reactor. This process makes it possible to synthesize random copolymers having a low vinyl content with an absence of styrene blocks. This patent also provides for a functionalization subsequent to the polymerization stage, in particular by means of a tin-based coupling agent.

SUMMARY

The inventors have now discovered, surprisingly, that the aims of the invention can be obtained by a continuous synthesis process comprising a polymerization stage carried out in several reactors in series, the temperature of the final reactor being greater than the temperature of the first reactor, purified monomer being reinjected into the reactors other than the first, and a stage of modification by means of a specific coupling agent, the modified diene elastomer obtained exhibiting a polydispersity index varying from 1.1 to 2 before modification and a low dead chain content.

A subject-matter of the invention is thus a process for the continuous synthesis of a modified diene elastomer comprising:

a) a stage of polymerization carried out by means of n reactors r1 to rn which are equipped with an internal stirring system, which are assumed perfectly stirred and which are arranged in series, n varying from 2 to 15, preferably from 2 to 9, the reactor r1 being fed by an input solution comprising a solvent, one or more monomers, an anionic polymerization initiator and a polar agent, one or more of the reactors r2 to rn additionally being fed by reinjection of a purified solution comprising solvent and/or monomer(s), b) a stage of modification of the living elastomer obtained in the preceding polymerization stage and exhibiting a polydispersity index of between 1.1 and 2, by means of at least one functionalization, coupling or star-branching agent, which makes it possible to introduce, into the elastomer, a functional group comprising at least one silicon atom directly connected to the elastomer chain.

The purity of the or of each reinjected solution is such that the proportion of the number of dead chains in the output stream from the reactor rn is, with respect to the number of living chains initiated in the reactor r1, significantly minimized and is less than 30%, preferably less than 10%. Without wishing to be committed to any one theory, it is assumed that this minimized content of dead chains promotes the degree of functionalization and thus contributes to the improvement in the hysteresis/processing compromise of the material.

DETAILED DESCRIPTION OF EXAMPLE EMBODIMENTS

In the context of the present patent application, the term "reinjection" refers to the repeating of the action of injection into a reactor ri', other than the reactor r1, already fed by the stream from ri'−1. The reinjection can be carried out directly into one or more of the reactors or, advantageously, by mixing with the stream resulting from ri'−1. The reinjection can be carried out with streams having a composition identical to or different from the r1 feed stream. When the reinjection takes place in at least two reactors, the natures of these reinjections can be identical or different. The term "reinjected monomer" refers to the monomer injected into ri' not resulting from the stream originating from ri'−1.

In the case of an anionic polymerization, the living chain is a carbanion. The carbanion is a very reactive entity. It reacts with protic entities or electrophilic entities.

Thus, if the feedstock of the first reactor contains protic impurities (alcohols, water, acids, and the like) or electrophilic impurities (carbonyls, and the like), the initiator will react first with these impurities to lead to inactive entities (alkoxides, and the like) incapable of initiating the polymerization of the monomers. This is why the first reactor is fed by an input solution which comprises, inter alia, the monomers and the initiator. Thus, the initiator is brought into contact with all of the constituents of the input solution prior to their introduction into the reactor in order to neutralize the impurities. The difference between the amount of initiator introduced at the inlet of the reactor r1 and the amount of initiator which has reacted with the impurities constitutes the amount of active initiator. The number of living chains initiated in the reactor r1 is equivalent to this amount of active initiator in the reactor r1.

On the other hand, for the subsequent reinjection(s) between the reactors, the neutralization of the impurities introduced by the reinjection will be carried out by the polymer carbanion present in these reactors. This neutralization prevents the polymer chain from propagating and the chain thus becomes dead. This entity is no longer reactive with the optional stopping, functionalization, coupling or star-branching agents.

This is why, apart from the feedstock of the first reactor, it is necessary to control the purity of each reinjected solution in order to guarantee the lowest possible dead-polymer content at the outlet of the reactor rn, i.e. less than 30% by number, preferably less than 10% by number, with respect to the total number of chains initiated in the reactor r1.

According to embodiments of the invention, the temperature of each reactor varies from 20° C. to 150° C., preferably from 30° C. to 120° C., and is greater than or equal to the temperature of the reactor which immediately precedes it, the temperature of the reactor rn being greater than the temperature of the reactor r1.

According to embodiments of the invention:

the amount by weight W1 of monomer(s) introduced into the reactor r1 is such that:

$$0.1 < \frac{W1}{\sum_{i=1}^{n} Wi} \leq 1$$

the amount by weight Wi' of monomer(s) reinjected into the reactor ri', when Wi'≠0, i' varying from 2 to n, is such that:

$$0 \leq \frac{Wi'}{\sum_{1}^{n} Wi} < 0.9$$

and such that Wi' represents from 5% to 100% by weight of the weight of the solution reinjected into the reactor ri', when Wi'≠0, where Wi is the amount by weight of monomer(s) introduced into the reactor ri, i varying from 1 to n, the amount by weight of all of the monomers entering the reactors r1 to rn representing from 5% to 25% by weight of all the inputs by weight of the process of the reactors r1 to rn, the overall conversion by weight Ci" in each reactor ri" is such that:

$$\frac{Cn}{n} - 0.2 < \frac{Ci''}{i''} < \frac{Cn}{n} + 0.2$$

where $$Ci'' = \frac{Pi''}{\sum_{1}^{n} Wi}$$

where Pi" is the weight of polymer formed at the outlet of the reactor ri", i" varying from 1 to n−1, and Cn is the overall conversion by weight in the reactor rn, with $$Cn = \frac{Pn}{\sum_{1}^{n} Wi}$$

where Pn is the weight of total polymer at the outlet of the reactor rn.

According to the process of embodiments of the invention, the polymerization stage makes it possible to continuously synthesize a living diene elastomer exhibiting a polydispersity index varying from 1.1 to 2, preferably varying from 1.1 to less than 1.7, more preferably varying from 1.2 to 1.6.

The term "amount by weight of all of the monomer(s) entering the reactors r1 to rn" is understood to mean the sum of the amount by weight of monomer(s) introduced into the reactor r1 by the input solution and of the amounts by weight of the monomer(s) reinjected into one or more of the reactors r2 to rn.

The term "polydispersity index" is understood to mean the ratio of the weight-average molecular weight to the number-average molecular weight. The weight-average and number-average molecular weights are measured by size exclusion chromatography.

The polymerization stage of the process according to embodiments of the invention makes it possible to control the polydispersity index of the polymer synthesized by the control of the conversion in each reactor and by the number of reactors.

The control of the conversion in each reactor is ensured by the temperature, the residence time, the amount of polar agent and the amount of monomer entering each reactor.

The balancing of the conversions in each reactor, as indicated above, makes it possible to minimize the polydispersity index.

By working at increasing temperature according to embodiments of the invention, the propagation in the following reactors is accelerated and the conversions are thus balanced.

The optional reinjection of a portion of the monomers into one or more of the reactors starting from the second has an impact on the amount of monomers present in the reactor and the residence time within said reactor. Thus, these reinjections, which constitute an advantageous implementation of the process of embodiments of the invention, also contribute to the balancing of the conversions and, as explained above, to the control of the polydispersity index.

Advantageously, the very high purity of the monomers reinjected makes it possible to reduce the impact of the side reactions which have a tendency to widen the molecular distribution of the polymer formed.

The residence times and the temperatures are also chosen in order not to promote these side reactions.

Preferably, the reactors are equipped with an internal stirring mechanism.

Preferably, the number of reactors is equal to 2 or 3, preferably 2.

When the number of reactors is equal to 2, the polymerization stage of the process according to embodiments of the invention exhibits at least one of the following characteristics and preferably all of the following characteristics:
- a reinjection of a solution comprising monomer(s) is carried out in the reactor r2,
- the purity of the solution reinjected into the reactor r2 is such that the proportion of the number of dead chains in the output stream from the reactor r2 is less than 10%, preferably less than 5%, of the number of living chains initiated in the reactor r1,
- the temperature of the reactors r1 and r2 varies from 20° C. to 150° C., preferably from 30° C. to 120° C., the temperature of the reactor r2 being greater than the temperature of the reactor r1,
- the amount by weight of monomer(s) introduced into the reactor r1 is greater than 10% and less than 100% of the total amount by weight of the monomers introduced into the reactors r1 and r2,
- the amount by weight of monomer(s) reinjected into the reactor r2 is less than 90% by weight of the total weight of monomer(s) injected into the reactor r1 and reinjected into the reactor r2,
- the amount by weight of all of the monomers entering the reactors r1 to rn representing from 5% to 25% by weight of the sum of the inputs by weight of the reactors r1 and r2,
- the overall conversion by weight in the reactor 1 is equal to half the overall conversion by weight in the reactor 2, +/−20%.

Preferably, the residence time in the reactor ri is between 1 and 60 minutes, preferably between 5 and 60 minutes, more preferably between 10 and 50 minutes. It is calculated in the following way:

$$\tau_i = \frac{V_i}{Q_{Vn}}$$

with:
$V_i$, reaction volume Ri, i varying from 1 to n
$Q_{Vn}$=flow rate by volume exiting the reactor n.

As explained above, a solution comprising monomer(s) can be reinjected into one or more of the reactors r2 to rn.

One or more of the reinjected solutions can contain a polar agent.

The purity of each reinjected solution is such that the proportion of the number of dead chains in the output stream from the reactor rn, with respect to the number of living chains initiated in the reactor r1, is minimized, preferably less than 30% by number, more preferably less than 10% by number and more preferentially less than 5% by number.

The term "purity of a reinjected solution" is understood to mean the proportion by weight of optional monomer(s), and of optional solvent and of optional polar agent, with respect to the total weight of the reinjected solution.

Each reinjected solution contains purified solvent and/or purified monomers.

The constituent or each constituent of the reinjected solution(s) can be, before reinjection, purified independently by any purification means normally used to purify the constituents, for example by adsorption, liquid/liquid extraction, gas/liquid extraction or distillation.

In particular, the solvent and/or the monomer(s) can be independently purified by adsorption, liquid/liquid extraction, gas/liquid extraction or distillation.

The adsorption can be carried out on zeolite or on alumina.

The liquid/liquid extraction can be carried out by means of sodium hydroxide.

The gas/liquid extraction can be carried out by means of a stream of air or nitrogen.

The distillation can be a single-stage distillation without reflux (or flash distillation) or a column distillation optionally under vacuum.

The flash distillation is carried out by means of an evaporation compartment. The column distillation is carried out by means of a distillation column.

Whatever the purification process chosen for each constituent, the purified phase is used to constitute the stream to be reinjected.

According to one embodiment, the residues from the process(es) for the purification of the or each constituent can be reinjected into the input solution feeding the first reactor. These residues consist of the monomers and/or of the solvent with a high concentration of impurities. The residues can then either constitute an extra contribution of monomer and/or of solvent to the input solution, or can constitute the sole source of monomer and/or of solvent of the input solution. This embodiment makes it possible to limit the loss of material in the case of reinjection.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic monomers having from 8 to 20 carbon atoms. In the case of copolymers, the latter contain from 20% to 99% by weight of diene units and from 1% to 80% by weight of vinylaromatic units.

The following in particular are suitable as conjugated dienes which can be used in the process in accordance with embodiments of the invention: 1,3-butadiene, 2-methyl-1, 3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, and the like.

The following in particular are suitable as vinylaromatic monomers: styrene, ortho-, meta- or para-methylstyrene, the "vinyltoluene" commercial mixture, para-(tert-butyl)styrene, methoxystyrenes, vinylmesitylene, divinylbenzene and vinylnaphthalene, and the like.

The diene elastomer is preferably selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The diene elastomer is generally prepared by anionic polymerization in the presence of a polymerization initiator. The polymerization initiator is included in the input solution.

Use may be made, as polymerization initiator, of any known monofunctional anionic initiator. However, an initiator comprising an alkali metal, such as lithium, is preferably used.

Use may be made, as polymerization initiator, of any known monofunctional anionic initiator. However, an initiator comprising an alkali metal, such as lithium, is preferably used. Those comprising a carbon-lithium bond are suitable in particular as organolithium initiators. Representative compounds are aliphatic organolithium compounds, such as ethyllithium, n-butyllithium (n-BuLi), isobutyllithium, and the like. The polymerization is carried out in the presence of a solvent included in the input solution.

The solvent used in the process according to embodiments of the invention is preferably an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

As explained above, the input solution, and also optionally one or more of the reinjected solutions, used in the process according to embodiments of the invention comprise(s) a polar agent.

Suitable in particular as chelating polar agents which can be used in the process in accordance with embodiments of the invention are the agents comprising at least one tertiary amine functional group or at least one ether functional group and preferably agents of tetrahydrofurfuryl ethyl ether or tetramethylethylenediamine type.

According to embodiments of the invention, the living diene elastomer included in the output stream from the polymerization reactor rn is subsequently reacted with at least one functionalization, coupling or star-branching agent, which makes it possible to introduce, into the elastomer, a functional group comprising at least one silicon atom directly connected to the elastomer chain.

Also suitable as silicon-based functionalization, coupling or star-branching agent are the functionalization agents of cyclic polysiloxane type, provided that the reaction medium does not make possible the polymerization of the cyclopolysiloxane. Mention may be made, as cyclic polysiloxanes, of those corresponding to the formula 1:

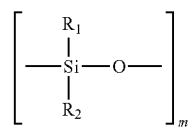

Formula 1 with m represents an integer with a value ranging from 3 to 8, preferably 3, and R1 and R2, which are identical or different, represent an alkyl radical of 1 to 10 carbon atoms, preferably an alkyl radical having from 1 to 4 carbon atoms. Mention may be made, among these compounds, of hexamethylcyclotrisiloxane.

Also suitable as silicon-based functionalization, coupling or star-branching agent are the compounds corresponding to the formula 2:

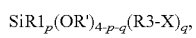

in which:

R3 is a saturated or unsaturated, cyclic or non-cyclic, divalent $C_1$-$C_{18}$ aliphatic hydrocarbon radical or divalent $C_6$-$C_{18}$ aromatic hydrocarbon radical, preferably a linear or branched, divalent $C_1$-$C_{10}$ aliphatic hydrocarbon radical, more preferably a linear divalent $C_1$-$C_6$ aliphatic hydrocarbon radical and more preferably still the linear $C_3$ hydrocarbon radical;

X is a hydrogen atom or a functional group capable of interacting with a reinforcing filler;

the R' radicals, which are substituted or unsubstituted and identical or different, represent a $C_1$-$C_{10}$, indeed even $C_1$-$C_8$, alkyl group, preferably a $C_1$-$C_4$ alkyl group, more preferably methyl and ethyl;

the R1 radicals, which are substituted or unsubstituted and identical or different, represent a $C_1$-$C_{10}$ alkyl group, indeed even a $C_1$-$C_8$ alkyl group;

p represents an integer with a value ranging from 0 to 2 and q represents an integer with the value 0 or 1, with the proviso that $p+q \leq 2$.

The various aspects relating to the formula 2, preferred or non-preferred, which precede can be combined with one another.

According to alternative forms of the invention, the functionalization agent of formula 2 does not comprise another functional group than that comprising the silicon atom of alkoxysilane type. It is then a tetraalkoxysilane, a monoalkyltrialkoxysilane or a dialkyldialkoxysilane.

According to other alternative forms of the invention, the functionalization agent of formula 2 comprises a functional group other than the functional group comprising the silicon atom, in particular capable of interacting with a reinforcing filler. This designation, however, does not exclude the possibility for the functional group comprising the silicon atom to also interact with a reinforcing filler.

The term "functional group capable of interacting with a reinforcing filler" is preferably understood to mean functional groups comprising at least one heteroatom chosen from N, S, O or P. Mention may be made, by way of example, among these functional groups, of protected or unprotected primary amines, protected or unprotected secondary amines or tertiary amines which are cyclic or non-cyclic, isocyanates, imines, cyanos, the protected or unprotected thiol functional group, carboxylates, epoxides or protected or unprotected primary phosphines, protected or unprotected secondary phosphines or tertiary phosphines.

Thus, according to alternative forms of the invention, the functional group capable of interacting with a reinforcing filler is a protected or unprotected primary amine, a protected or unprotected secondary amine or a tertiary amine. The nitrogen atom can then be substituted by two identical or different groups which can be a trialkylsilyl radical, the alkyl group having from 1 to 4 carbon atoms, or a $C_1$-$C_{10}$, preferably $C_1$-$C_4$, alkyl radical, more preferably a methyl or ethyl radical, or else the two substituents of the nitrogen form, with the latter, a heterocycle comprising a nitrogen atom and at least one carbon atom, preferably from 2 to 6 carbon atoms.

Mention may be made, for example, as functionalization agent, the functional group capable of interacting with a reinforcing filler of which is an amine, of (N,N-dialkylaminopropyl)trialkoxysilanes, (N,N-dialkylaminopropyl)alkyldialkoxysilanes, (N-alkylaminopropyl)trialkoxysilanes and (N-alkylaminopropyl)alkyldialkoxysilanes, the secondary amine functional group of which is protected by a trialkylsilyl group, and aminopropyltrialkoxysilanes and aminopropylalkyldialkoxysilanes, the primary amine functional group of which is protected by two trialkylsilyl groups. The alkyl substituents present on the nitrogen atom are linear or branched and advantageously have from 1 to 10 carbon atoms, preferably from 1 to 4, more preferably 1 or 2. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable as alkyl substituents. The alkoxy substituents are linear or branched and generally have from 1 to 10 carbon atoms, indeed even from 1 to 8, preferably from 1 to 4 and more preferably 1 or 2.

Preferably, the functionalization agent can be chosen from (3-N,N-dialkylaminopropyl)trialkoxysilanes and (3-N,N-dialkylaminopropyl)alkyldialkoxysilanes, the alkyl group on the silicon atom being the methyl or ethyl group and the alkoxy group being the methoxy or ethoxy group.

Preferably, the functionalization agent can be chosen from (3-N,N-alkyltrimethylsilylaminopropyl)trialkoxysanes and (3-N,N-alkyltrimethylsilylaminopropyl)alkyldialkoxysilanes, the alkyl group on the silicon atom being the methyl or ethyl group and the alkoxy group being the methoxy or ethoxy group.

Preferably, the functionalization agent can be chosen from (3-N,N-bistrimethylsilylaminopropyl)trialkoxysilanes and (3-N,N-bistrimethylsilylaminopropyl)alkyldialkoxysilanes, the alkyl group on the silicon atom being the methyl or ethyl group and the alkoxy group being the methoxy or ethoxy group.

According to alternative forms of the invention, the functional group capable of interacting with a reinforcing filler is an isocyanate functional group. Preferably, the functionalization agent can be chosen from (3-isocyanatopropyl)trialkoxysilanes and (3-isocyanatopropyl)alkyldialkoxysilanes, the alkyl group being the methyl or ethyl group and the alkoxy group being the methoxy or ethoxy group.

According to alternative forms of the invention, the functional group capable of interacting with a reinforcing filler is an imine functional group. Preferably, the functionalization agent can be chosen from N-(1,3-dimethylbutylidene)-3-(trimethoxysilyl)-1-propanamine, N-(1,3-dimethylbutylidene)-3-(triethoxysilyl)-1-propanamine, N-(1,3-methylethylidene)-3-(trimethoxysilyl)-1-propanamine, N-(1,3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylidene)-3-(triethoxysilyl)-1-propanamine, N-(4-N,N-dimethylaminobenzylidene)-3-(trimethoxysilyl)-1-propanamine, N-(4-N,N-dimethylaminobenzylidene)-3-(triethoxysilyl)-1-propanamine, N-(cyclohexylidene)-3-(trimethoxysilyl)-1-propanamine, N-(cyclohexylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole or N-(3-triethoxysilylpropyl)-4,5-imidazole.

According to alternative forms of the invention, the functional group capable of interacting with a reinforcing filler is an cyano functional group. Preferably, the functionalization agent can be chosen from (3-cyanopropyl)trialkoxysilanes and (3-cyanopropyl)alkyldialkoxysilanes, the alkyl group being the methyl or ethyl group and the alkoxy group being the methoxy or ethoxy group.

According to alternative forms of the invention, the functional group capable of interacting with a reinforcing filler is a protected or unprotected thiol functional group. Mention may be made, by way of example, of (S-trialkylsilylmercaptopropyl)trialkoxysilanes, (S-trialkylsilylmercaptopropyl)alkyldialkoxysilanes, (S-trialkylsilylmercaptoethyl)trialkoxysilanes and (S-trialkylsilylmercaptoethyl)alkyldialkoxysilanes, the alkyl group on the silicon atom bearing the alkoxysilane groups being the methyl or ethyl group and the alkoxy group being the methoxy or ethoxy group. The alkyl group on the silicon bonded to the sulfur atom is the methyl or tert-butyl group.

According to alternative forms of the invention, the functional group capable of interacting with a reinforcing filler is a carboxylate functional group. Mention may be made, as carboxylate functional group, of acrylates or methacrylates. Such a functional group is preferably a methacrylate. Preferably, the functionalization agent can be chosen from (3-methacryloyloxypropyl)trialkoxysilanes and (3-methacryloyloxypropyl)alkyldialkoxysilanes, the alkyl group being the methyl or ethyl group and the alkoxy group being the methoxy or ethoxy group.

According to alternative forms of the invention, the functional group capable of interacting with a reinforcing filler is an epoxide functional group. Preferably, the functionalization agent can be chosen from (3-glycidyloxypropyl)trialkoxysilanes and (3-glycidyloxypropyl)alkyldialkoxysilanes, the alkyl group being the methyl or ethyl group and the alkoxy group being the methoxy or ethoxy group.

According to alternative forms of the invention, the functional group capable of interacting with a reinforcing filler is a protected or unprotected primary phosphine functional group, a protected or unprotected secondary phosphine functional group or a tertiary phosphine functional group. Preferably, the functionalization agent can be chosen from (3-P,P-bistrimethylsilylphosphinopropyl)trialkoxysilanes, (3-P,P-bistrimethylsilylphosphinopropyl)alkyldialkoxysilanes, (3-P,P-alkyltrimethylsilylphosphinopropyl)

trialkoxysilanes, (3-P,P-alkyltrimethylsilylphosphinopropyl)alkyldialkoxysilanes, (3-P,P-dialkylphosphinopropyl)trialkoxysilanes and (3-P,P-dialkylphosphinopropyl)alkyldialkoxysilanes, the alkyl group on the phosphorus atom being the methyl, ethyl or phenyl group, the alkyl group on the silicon atom being the methyl or ethyl group and the alkoxy group being the methoxy or ethoxy group.

The different aspects, preferred or non-preferred, which precede and which relate to the functionalization agent of formula 2, in particular with regard to the nature of the other functional group capable of interacting with the reinforcing filler, the nature of the spacer group R3 and the nature of the alkoxysilane group, can be combined with one another. According to the process of embodiments of the invention, just one silicon-based functionalization, coupling or star-branching agent or of a mixture of at least two of these agents can be used.

According to the process of embodiments of the invention, the silicon-based functionalization, coupling or star-branching agent is in solution in a solvent compatible with that included in the stream resulting from the polymerization reactor m and feeding the functionalization device. The term "compatible solvent" is understood to mean, generally, solvent miscible with the polymerization solvent. Preferably, this solvent is identical to the polymerization solvent.

According to the process of embodiments of the invention, the silicon-based functionalization, coupling or star-branching agent is added in proportions such that the molar ratio of this silicon-based functionalization, coupling or star-branching agent to the polymerization initiator depends essentially on the type of modified diene elastomer desired and on the number of sites of the functionalization, coupling or star-branching agent which are reactive with regard to the living elastomer. The term "reactive sites" is understood to mean essentially, in the context of embodiments of the invention, Si—O bonds in the formula 1 or Si—OR bonds in the formula 2.

It is clear for a person skilled in the art that the functionalization agents of formula 1 make it possible to modify the elastomer only at the chain end and do not make possible coupling and star-branching. The molar ratio of this silicon-based functionalization agent to the polymerization initiator defines only the proportions of chains functionalized at the chain end and of non-functional chains in the modified elastomer.

Thus, with a ratio ranging from 0.40 to 0.75, preferably from 0.45 to 0.65 and more preferably still from 0.45 to 0.55, the formation of coupled entities within the modified elastomer is favoured if the agent of formula 2 has at least two sites which are reactive with regard to the living elastomer. In the same way, with a ratio ranging from 0.15 to 0.40, preferably from 0.20 to 0.35, star-branched entities (3 and/or 4 branches) are predominantly formed within the modified elastomer if the agent of formula 2 has at least three sites which are reactive with regard to the living elastomer. With a ratio greater than or equal to 0.75, preferably greater than 1, entities functionalized at the chain end are predominantly formed if the agent has at least one site which is reactive with regard to the living elastomer.

According to the process of embodiments of the invention, the silicon-based functionalization, coupling or star-branching agent is continuously injected in homogeneous manner into a functionalization device fed at the inlet of the device by the output stream from the polymerization reactor rn comprising the living diene elastomer bearing an active site. The term "functionalization device" is understood to mean one or more reactors in series. These reactors can be of identical or different nature, in particular tubular, tubular with axial dispersion, stirred or assumed perfectly stirred. The continuous injection of at least one functionalization, coupling or star-branching agent is carried out in at least one of these reactors.

The residence time in each tubular reactor, or tubular reactor having axial dispersion, is preferably between 0 and 120 minutes, in particular between 0.1 and 60 minutes, more preferably between 0.1 and 5 minutes.

The residence time in each stirred reactor or perfectly stirred continuous reactor is preferably between 0 and 60 minutes, more preferably between 5 and 50 minutes.

According to embodiments of the invention, the functionalization temperature varies from 30° C. to 150° C. Preferably, the functionalization temperature is equal to the temperature within the polymerization reactor which immediately precedes the functionalization device.

When the silicon-based functionalization, coupling or star-branching agent is in accordance with the formula 2, a particularly advantageous implementation of embodiments of the invention consists in using a device for the functionalization of the living diene elastomer in accordance with that described in Application FR 3 009 556 A1, the content of which should be regarded as forming part of the present patent application. It is thus possible to proceed competitively, economically and flexibly, in a way adaptable to industrial production, to the synthesis of modified diene elastomers with mastery of the distribution of the functional entities (functionalized at the chain end and/or coupled and/or star-branched) within the elastomer.

The functionalization device of this advantageous implementation of embodiments of the invention, when the silicon-based functionalization, coupling or star-branching agent is in accordance with the formula 2, can have, for model, one of the following models:

a tubular reactor with axial dispersion, or alternatively
a tubular reactor with axial dispersion in series with at least one stirred, assumed perfectly stirred, continuous reactor, or alternatively
at least one tubular reactor with axial dispersion in series with a stirred, assumed perfectly stirred, continuous reactor, or alternatively
several tubular reactors with axial dispersion in series with several stirred, assumed perfectly stirred, continuous reactors, or alternatively
at least two stirred, assumed perfectly stirred, continuous reactors in series.

According to a specific embodiment, the living diene elastomer included in the output stream from the polymerization reactor rn can be reacted with at least two silicon-based functionalization, coupling or star-branching agents, more particularly at least two different agents in accordance with the formula 2. Mention may be made, for example, of the combination of a trialkoxysilane and of an alkyldialkoxysilane, each bearing a functional group capable of interacting with a reinforcing filler which is preferably identical, this functional group being advantageously chosen from protected or unprotected primary amines, protected or unprotected secondary amines or tertiary amines which are cyclic or non-cyclic, the protected or unprotected thiol functional group.

According to another specific embodiment, which can optionally be combined with the preceding embodiment, the living diene elastomer included in the output stream from the polymerization reactor rn can be reacted, in addition, with a silicon-based or tin-based coupling or star-branching agent. Mention may be made, among these, of the tin or silicon derivatives of formula $MR_xX_{4-x}$, M represents a Sn or Si atom, x represents an integer with a value from 0 to 2, preferably with a value from 0 to 1, R represents an alkyl radical of 1 to 10 carbon atoms, preferably an alkyl radical having from 1 to 4 carbon atoms, and X is a halogen atom, preferably chlorine. Mention may be made, as examples, of compounds such as tin tetrachloride, methyltin trichloride, dimethyltin dichloride, tetrachlorosilane, methyltrichlorosilane and dimethyldichlorosilane.

The reaction with this complementary coupling or star-branching agent can take place in a way known per se.

According to embodiments of the invention, the preferred aspects of this specific embodiment of the process for the synthesis of the modified diene elastomer can be combined with the different aspects, preferred or non-preferred, of the other embodiments or alternative forms of the process which it complements.

The process for the synthesis of the modified diene elastomer according to embodiments of the invention can be continued in a way known per se.

According to alternative forms of the invention, the process can comprise a conventional stage of stopping by means, for example, of methanol or water.

According to the alternative forms of the invention according to which the functionalization agent bears a protected primary or secondary amine functional group, the synthesis process can be continued by a stage of deprotection of the primary or secondary amine. This stage is carried out after the modification reaction. The chains functionalized by the protected amine group can, by way of example, be reacted with an acid, a base, a fluorinated derivative, such as tetrabutylammonium fluoride, a silver salt, such as silver nitrate, and the like, in order to deprotect this amine functional group. These different methods are described in the work "Protective Groups in Organic Synthesis", T. W. Green and P. G. M. Wuts, Third Edition, 1999. This deprotection stage can have the effect of hydrolysing all or a portion of the hydrolysable alkoxysilane functional groups of the modified diene elastomer in order to convert them into silanol functional groups.

According to the alternative forms of the invention according to which the functionalization agent bears a protected thiol functional group, the synthesis process can be continued by a stage of deprotection of the thiol. This stage is carried out after the modification reaction. The chains functionalized by the protected thiol group can, by way of example, be reacted with water, an alcohol or an acid (hydrochloric acid, sulfuric acid, carboxylic acid). This deprotection stage can have the effect of hydrolysing all or a portion of the hydrolysable alkoxysilane functional groups of the modified diene elastomer in order to convert them into silanol functional groups.

According to the alternative forms of the invention according to which the functionalization agent bears a protected primary or secondary phosphine functional group, the synthesis process can be continued by a stage of deprotection of the phosphine. This stage is carried out after the modification reaction. The chains functionalized by the protected phosphine group can, by way of example, be reacted with water, an alcohol or an acid (hydrochloric acid, sulfuric acid, carboxylic acid). This deprotection stage can have the effect of hydrolysing all or a portion of the hydrolysable alkoxysilane functional groups of the modified diene elastomer in order to convert them into silanol functional groups.

According to alternative forms of the invention, the synthesis process can comprise a stage of hydrolysis of the hydrolysable alkoxysilane functional groups by addition of an acidic, basic or neutral compound, as described in the document EP 2 266 819 A1. The hydrolysable functional groups are then converted into silanol functional groups.

According to alternative forms of the invention, the synthesis process with a functionalization agent of formula 1 can comprise a stage of reaction with a proton-donating compound in order to result in the diene polymer silanol-functionalized at the chain end.

The process for the synthesis of the modified diene elastomer according to embodiments of the invention can be continued in a way known per se by the stages of recovery of the modified elastomer.

According to alternative forms of this process, these stages comprise a stripping stage for the purpose of recovering the elastomer resulting from the prior stages in dry form. This stripping stage can have the effect of hydrolysing all or a portion of the hydrolysable functional groups of the modified diene elastomer, in particular the hydrolysable alkoxysilane functional groups, converting them into silanol functional groups. At least 50 mol % to 70 mol % of the hydrolysable functional groups can thus be hydrolysed.

The process according to embodiments of the invention is a continuous process which can be adapted to industrial production, capable of synthesizing modified diene elastomers with a low molecular weight distribution before modification, which, used in reinforced rubber compositions, in particular intended for the manufacture of tires, make possible a gain with regard to the hysteresis of the composition/processing of the material thus synthesized compromise.

The abovementioned characteristics of the present invention, and also others, will be better understood on reading the following description of several implementational examples of the invention, given by way of illustration and without limitation.

Measurements and Tests Used

Glass Transition Temperature

In these examples, the glass transition temperatures (Tg) of the elastomers are determined using a differential scanning calorimeter.

Polydispersity Index

The polydispersity index of the polymer is determined by means of SEC (size exclusion chromatography).

The SEC (Size Exclusion Chromatography) technique makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the distribution of the molar masses of a polymer. The various number-average molar masses ($M_n$) and weight-average molar masses ($M_w$) can be determined from commercial standards and the polydispersity index ($PI=M_w/M_n$) can be calculated via a "Moore" calibration.

There is no specific treatment of the polymer sample before analysis. The latter is simply dissolved in the elution solvent at a concentration of approximately $1 \text{ g·l}^{-1}$. The solution is then filtered through a filter with a porosity of 0.45 µm before injection.

The apparatus used is a Waters Alliance chromatographic line. The elution solvent is either tetrahydrofuran or tetrahydrofuran+1 vol % of diisopropylamine+1 vol % of triethylamine, the flow rate is $1 \text{ ml·min}^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 25% by weight of units of styrene type, 23% by weight of units of 1,2-type and 50% by weight of units of trans-1,4-type.

Conversion

The conversions are measured by weighing the solids content of the solution containing the polymer. In this method, solution containing the polymer is withdrawn at the outlet of the reactor. This solution is introduced into a pre-tared tray. The mass of solution is thus weighed.

The sample is dried under a reduced pressure of 200 mmHg at 140° C. for 15 minutes. The tray is subsequently placed in a desiccator containing silica gel for 2 minutes. Weighing the tray then makes it possible to determine the weight of polymer of the withdrawn sample. Then, via the concentration of monomers, the conversion at the outlet of the reactor is worked back to.

$$C = \frac{\frac{W_{solids\ content}}{W_{sample}}}{\frac{\sum_1^n Wi}{\sum_1^n Qi}} \cdot 100$$

with $\sum_i^n Wi$ which represents the sum of all the inputs by weight of monomers in the entire process (reactors 1 to n)
and $\sum_i^n Qi$ which represents the sum of all the inputs by weight in the entire process (reactors 1 to n) (solvent, monomers, catalysts, and the like),
the ratio $$\frac{\sum_1^n Wi}{\sum_1^n Qi}$$

corresponding to the % by weight of monomers.

Microstructure of the Elastomers

The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C. and Coste, N., Applied Spectroscopy, 2006, 60, 619-29] carried out using standard elastomers having a composition determined by $^{13}C$ NMR. The styrene content and the microstructure are then calculated from the NIR spectrum of an elastomer film having a thickness of approximately 730 µm. The spectrum is acquired in transmission mode between 4000 and 6200 $cm^{-1}$ with a resolution of 2 $cm^{-1}$ using a Bruker Tensor 37 Fourier-transform near-infrared spectrometer equipped with an InGaAs detector cooled by the Peltier effect.

Content of Chains $(CH_3)_2SiOH$-Functionalized at the Chain End by Nuclear Magnetic Resonance 2D $^1H$-$^{29}Si$ NMR makes it possible to confirm the nature of the functional group by virtue of the chemical shift values of the silicon nuclei and of the protons in the $^2J$ vicinity (via 2 bonds). It uses a $^2J^1H$-$^{29}Si$ coupling constant value of 8 Hz. The chemical shift of the silicon of the $SBR(CH_3)_2SiOH$ entity at the chain end is approximately 11-12 ppm.

$^1H$ NMR makes it possible to quantify the methyl groups borne by the silicon ($SiCH_3$) by integration of the corresponding signal, located around d=0 ppm. The samples are dissolved in carbon disulfide ($CS_2$). 100 µl of deuterated cyclohexane ($C_6D_{12}$) are added for the lock signal. The NMR analyses are carried out on a Bruker 500 MHz spectrometer equipped with a 5 mm BBIz "broad band" probe. For the quantitative $^1H$ NMR experiment, the sequence uses a 30° pulse and a repetition time of 2 seconds.

The content of chains $(CH_3)_2SiOH$-functionalized at the chain end is calculated by the molar ratio of the amount of functional groups determined by NMR to the amount of active initiator introduced.

In addition to the functionalization, this content also makes it possible to demonstrate the content of dead chains in the living diene elastomer at the outlet of the reactor m, which is the complement to 100 of the content of functionalized chains.

Intrinsic Viscosity

The intrinsic viscosity of the elastomers at 25° C. is determined from a 0.1 $g \cdot dl^{-1}$ solution of elastomer in toluene, according to the following principle:

The intrinsic viscosity is determined by the measurement of the flow time t of the polymer solution and of the flow time $t_o$ of the toluene in a capillary tube.

The flow time of the toluene and the flow time of the 0.1 $g \cdot dl^{-1}$ polymer solution are measured in an Ubbelohde tube (diameter of the capillary 0.46 mm, capacity from 18 to 22 ml) placed in a bath thermostatically controlled at 25-0.1° C.

The intrinsic viscosity is obtained by the following relationship:

$$h_{inh} = \frac{1}{C}\ln\left[\frac{(t)}{(t_o)}\right]$$

with:

C: concentration of the solution of polymer in toluene in $g \cdot dl^{-1}$, t: flow time of the solution of polymer in toluene in seconds, $t_o$: flow time of the toluene in seconds, $h_{inh}$: intrinsic viscosity expressed in $dl \cdot g^{-1}$.

EXAMPLES

Methylcyclohexane, butadiene, styrene and tetrahydrofurfuryl ethyl ether are continuously introduced, according to the proportions described in each example, into a pilot-scale continuous polymerization plant containing several stirred continuous reactors, assumed perfectly stirred according to a person skilled in the art. n-Butyllithium (n-BuLi) is introduced in a sufficient amount in order to neutralize the protic impurities introduced by the different constituents present in the line input.

The residence times and the concentrations indicated in the examples are calculated from the flow rates of the different constituents entering the polymerization process.

For Examples 1 to 4, a sample is withdrawn at the outlet of the reactor rn in order to determine the polydispersity index of the polymer before modification. The withdrawn sample of living polymer is stopped by introduction of methanol in a large molar excess with respect to the initiator. The polydispersity index is then measured by size exclusion chromatography.

Furthermore, at the outlet of the reactor rn, the elastomer stream is continuously introduced into a tubular reactor having axial dispersion continuously supplied with an excess of hexamethylcyclotrisiloxane in cyclohexane in order to functionalize the living polymer.

For Example 5, a sample is withdrawn at the outlet of the reactor rn in order to determine the polydispersity index of the polymer before modification. The withdrawn sample of living polymer is stopped by introduction of methanol in a large molar excess with respect to the initiator. The polydispersity index is then measured by size exclusion chromatography.

Furthermore, at the outlet of the second polymerization reactor, the living elastomer stream is continuously introduced into a functionalization device comprising a static mixer consisting of 36 elements of Kenics KMR type and a continuous stirred 32.5-liter reactor, assumed perfectly stirred by a person skilled in the art, with a mean residence time of 30 minutes. The functionalization device is also continuously supplied with (3-N,N-dimethylaminopropyl)trimethoxysilane in solution in methylcyclohexane with a molar ratio controlled with respect to the living polymer for the purpose of coupling it.

For examples 1 to 5, a purification of the butadiene and/or of the solvent is carried out continuously by means of an alumina column. This column is packed with a fixed bed of aluminas of Axsorb 920 type.

The minimum L/D ratio of the fixed bed is 4.

The minimum column diameter/mean alumina particle diameter ratio is 10.

The empty-tank Reynolds number is greater than 2.

The minimum residence time of the fluid in the full column is 5.3 minutes.

The column is maintained under the following conditions:
Temperature=10° C.
Pressure=5 bar.

Example 1

Butadiene/styrene polymer is synthesized according to a comparative process using 9 reactors in series.

The reinjected butadiene is continuously purified on an alumina column as described above.

The operating conditions are specified in Table 1.

TABLE 1

| Operating conditions | Value | Unit | Reactor |
|---|---|---|---|
| Number of reactors | 9 | — | — |
| Volume of the reactors | 1.83 | 1 | 1 |
|  | 2.411 |  | 2 |
|  | 2.411 |  | 3 |
|  | 2.411 |  | 4 |
|  | 2.411 |  | 5 |
|  | 2.411 |  | 6 |
|  | 4.441 |  | 7 |

TABLE 1-continued

| Operating conditions | Value | Unit | Reactor |
|---|---|---|---|
|  | 4.441 |  | 8 |
|  | 4.441 |  | 9 |
| % Styrene (1) | 45 | % | — |
| % by weight of monomers (2) | 12.5 | % | — |
| Polar agent (tetrahydrofurfuryl ethyl ether) | $8.2 \times 10^{-7}$ | mol/m$^3$ | 9 |
| Active initiator (n-butyllithium) | $5.1 \times 10^{-7}$ | mol/m$^3$ | 9 |
| Residence time | 6.53 | min | 9 |
| Temperature | 60 | ° C. | 1, 2, 3, 4, 5, 6, 7, 8, 9 |
| Butadiene reinjection (3) | 8 | % | 7 |
| Overall conversion by weight (4) | 8 | % | 1 |
|  | 26.9 | % | 3 |
|  | 47.1 | % | 6 |
|  | 70.3 | % | 9 |

(1) by weight, with respect to the sum of all the inputs by weight of monomers of the process
(2) by weight, with respect to the sum of all the inputs by weight of the process
(3) by weight, with respect to the total weight of the monomers injected into all of the reactors
(4) overall conversion by weight in the reactor The characteristics of the polymer obtained at the outlet of the reactor 9 are given in Table 2.

TABLE 2

| Vinyl content (5) | 24.0 | % |
|---|---|---|
| Styrene content (6) | 28.5 | % |
| Tg | −46.3 | ° C. |
| PI | 1.22 | — |
| $M_n$ | 127.0 | kg/mol |
| Amount of functional groups | 7.3 | mmol/kg |
| Living polymer content (7) | 95.8 | % |

(5) by weight of the total weight of the butadiene units introduced into all of the reactors
(6) by weight of the total weight of all of the monomers introduced into all of the reactors
(7) molar ratio of the amount of functional groups determined by NMR to the amount of active initiator introduced

Example 2

Styrene/butadiene polymer is synthesized according to a process according to embodiments of the invention using 6 reactors in series.

The reinjected butadiene is continuously purified by an alumina column as described above. The operating conditions are specified in Table 3.

TABLE 3

| Operating conditions | Value | Unit | Reactor |
|---|---|---|---|
| Number of reactors | 6 | — | — |
| Volume of the reactors | 2.411 | 1 | 1 |
|  | 2.411 |  | 2 |
|  | 2.411 |  | 3 |
|  | 4.441 |  | 4 |
|  | 4.441 |  | 5 |
|  | 4.441 |  | 6 |
| % Styrene (1) | 45 | % |  |
| % by weight of monomers (2) | 12.5 | % | — |
| Polar agent (tetrahydrofurfuryl ethyl ether) | $8.2 \times 10^{-7}$ | mol/m$^3$ | 6 |
| Active initiator (n-butyllithium) | $5.1 \times 10^{-7}$ | mol/m$^3$ | 6 |
| Residence time | 9.49 | min | 6 |

TABLE 3-continued

| Operating conditions | Value | Unit | Reactor |
|---|---|---|---|
| Temperature | 55 | ° C. | 1 |
|  | 55 |  | 2 |
|  | 55 |  | 3 |
|  | 65 |  | 4 |
|  | 65 |  | 5 |
|  | 65 |  | 6 |
| Butadiene reinjection (3) | 8 | % | 4 |
| Overall conversion by | 10.0 | % | 1 |
| weight (4) | 33.8 | % | 3 |
|  | 64.4 | % | 6 |

(1) by weight, with respect to the sum of all the inputs by weight of monomers of the process
(2) by weight, with respect to the sum of all the inputs by weight of the process
(3) by weight, with respect to the total weight of the monomers injected into all of the reactors
(4) overall conversion by weight in the reactor The characteristics of the polymer obtained at the outlet of the reactor 6 are given in Table 4.

TABLE 4

| Vinyl content (5) | 23.2 | % |
|---|---|---|
| Styrene content (6) | 29.0 | % |
| Tg | −45.9 | ° C. |
| $M_n$ | 123.4 | kg/mol |
| PI | 1.26 | — |
| Amount of functional groups | 7.98 | mmol/kg |
| Living polymer content (7) | 95.9 | % |

(5) by weight of the total weight of the butadiene units introduced into all of the reactors
(6) by weight of the total weight of all of the monomers introduced into all of the reactors
(7) molar ratio of the amount of functional groups determined by NMR to the amount of active initiator introduced Thus, this example shows that it is possible to synthesize a functional polymer with a reduced polydispersity index using a polythermal process having 6 reactors in series. By virtue of the temperature gradient, the conversions are balanced (content of 30% between the reactors 1 and 3 and between the reactors 3 and 6) and make it possible to obtain a PI equivalent to that obtained by the synthesis having 9 reactors of Example 1, nevertheless a priori more efficient in reducing the PI as a result of the higher number of reactors.

The temperature gradient thus makes it possible to maintain a reduced polydispersity index while decreasing the number of reactors. This has a strong impact on the cost of the process and thus on the economic aspect of its introduction onto the industrial scale.

Example 3

The object of this example is to compare two syntheses of a functionalized butadiene/styrene polymer carried out by means of two polymerization reactors in series and of a functionalization reactor.

During the first synthesis of functionalized polymer, the polymerization does not comprise reinjection of monomer into the second reactor.

The second synthesis of functionalized polymer is carried out according to a process with reinjection of monomers according to embodiments of the invention. The solvent and the butadiene which are reinjected into the second reactor during the polymerization are continuously purified on alumina columns as described above.

The operating conditions are specified in Table 5.

TABLE 5

| Operating conditions | Value Synthesis 1 | Value Synthesis 2 | Unit | Reactor |
|---|---|---|---|---|
| Number of reactors | 2 | 2 | — | — |
| Volume of the reactors | 14 | 14 | 1 | 1 |
|  | 14 | 14 |  | 2 |
| % Styrene (1) | 40 | 40 | % | — |
| % by weight of monomers (2) | 13 | 13 | % | 1 |
| Polar agent (tetrahydrofurfuryl ethyl ether) | $5.8 \times 10^{-7}$ | $5.8 \times 10^{-7}$ | mol/m³ | 2 |
| Active initiator (n-butyllithium) | $8.5 \times 10^{-7}$ | $8.5 \times 10^{-7}$ | mol/m³ | 2 |
| Residence time | 30 | 30 | min | 2 |
| Temperature | 50 | 50 | ° C. | 1 |
| Temperature | 60 | 60 | ° C. | 2 |
| Solvent reinjection (3) | 0 | 10 | % | 2 |
| Butadiene reinjection (4) | 0 | 50 | % | 2 |
| Conversion by weight of monomers (5) | 76.6 | 55.8 | % | 1 |
|  | 96.1 | 93.6 | % | 2 |

(1) by weight, with respect to the sum of all the inputs by weight of monomers of the process
(2) by weight, with respect to the sum of all the inputs by weight of the process
(3) by weight, with respect to the sum of all the inputs of solvent of the process
(4) by weight, with respect to the total weight of the monomers injected into all of the reactors
(5) overall conversion by weight in the reactor The characteristics of the polymers obtained at the outlet of the reactor 2 are given in Table 6.

TABLE 6

|  | Synthesis 1 | Synthesis 2 | Unit |
|---|---|---|---|
| Vinyl content (6) | 49.0 | 49.1 | % |
| Styrene content (7) | 39.5 | 38.4 | % |
| Tg | −14.1 | −15.4 | ° C. |
| $M_n$ | 111.0 | 113.1 | kg/mol |
| PI | 1.65 | 1.53 | — |
| Amount of functional groups | 8.80 | 8.84 | mmol/kg |
| Living polymer content (8) | 98.5 | 96.3 | % |

(6) by weight of the total weight of the butadiene units introduced into all of the reactors
(7) by weight of the total weight of all of the monomers introduced into all of the reactors
(8) molar ratio of the amount of functional groups quantitatively determined by NMR to the amount of active initiator introduced Synthesis 2 exhibits more balanced conversions between the reactors 1 and 2 than Synthesis 1.

In this way, the functionalized polymer synthesized by means of Synthesis 2 with reinjection of monomers has a lower PI than that of Synthesis 1 carried out without reinjection of monomers, while maintaining an equivalent degree of functionalization.

Example 4

The object of this example is to quantify the impact of the purification of butadiene on the living polymer content at the polymerization outlet.

The first synthesis comprises a continuous reinjection of unpurified butadiene during the polymerization. The unpurified butadiene contains, as predominant impurity, tert-butylcatechol (TBC) at a content of 300 ppm.

The second synthesis comprises, during the polymerization, a continuous reinjection of butadiene purified by flash distillation under the following temperature and pressure conditions:

P=1.1 bar
T=50° C.

The solvent reinjected in the two syntheses is continuously purified by an alumina column.

The operating conditions are specified in Table 7.

TABLE 7

| Operating conditions | Value Synthesis 1 | Value Synthesis 2 | Unit | Reactor |
|---|---|---|---|---|
| Number of reactors | 2 | 2 | — | — |
| Volume of the reactors | 32.5 | 32.5 | l | 1 |
|  | 32.5 | 32.5 |  | 2 |
| % Styrene (1) | 35 | 35 | % | — |
| % by weight of monomers (2) | 13 | 13 | % | 1 |
| Polar agent (tetrahydrofurfuryl ethyl ether) | $1.9 \times 10^{-7}$ | $1.9 \times 10^{-7}$ | mol/m$^3$ | 2 |
| Active initiator (n-butyllithium) | $7.6 \times 10^{-7}$ | $7.6 \times 10^{-7}$ | mol/m$^3$ | 2 |
| Residence time | 30 | 30 | min | 2 |
| Temperature | 40 | 40 | ° C. | 1 |
| Temperature | 70 | 70 | ° C. | 2 |
| Solvent reinjection (3) | 10 | 10 | % | 2 |
| Butadiene reinjection (4) | 19.5 | 19.5 | % | 2 |
| Conversion by weight of monomers (5) | 39.0 | 38.3 | % | 1 |
|  | 86.7 | 86.6 | % | 2 |

(1) by weight, with respect to the sum of all the inputs by weight of monomers of the process
(2) by weight, with respect to the sum of all the inputs by weight of the process
(3) by weight, with respect to the sum of all the inputs of solvent of the process
(4) by weight, with respect to the total weight of the monomers injected into all of the reactors
(5) overall conversion by weight in the reactor The characteristics of the polymers obtained at the outlet of the reactor 2 are given in Table 8.

TABLE 8

|  | Synthesis 1 | Synthesis 2 | Unit |
|---|---|---|---|
| Vinyl content (6) | 36.2 | 36.8 | % |
| Styrene content (7) | 29.4 | 29.6 | % |
| Tg | −37.0 | −36.3 | ° C. |
| M$_n$ | 111.5 | 110.8 | kg/mol |
| PI | 1.50 | 1.51 | — |
| Amount of functional groups | 8.2 | 8.74 | mmol/kg |
| Living polymer content (8) | 92.6 | 98.6 | % |

(6) by weight of the total weight of the butadiene units introduced into all of the reactors
(7) by weight of the total weight of all of the monomers introduced into all of the reactors
(8) molar ratio of the amount of functional groups determined by NMR to amount of active initiator introduced It can thus be seen that the purification of the butadiene has a strong impact on the living polymer content measured by the method described above. The living polymer content also corresponds to the content of functional chains. It can thus be concluded that the process with a reinjection of purified butadiene makes possible a more efficient functionalization.

Example 5

The object of this example is to illustrate the functionalization of an elastomer of reduced PI by a coupling agent.

The synthesis of the polymer comprises a reinjection of butadiene continuously purified by flash distillation under the following temperature and pressure conditions:
P=1.1 bar
T=50° C.

The reinjected solvent is continuously purified by an alumina column as described above.

The operating conditions are specified in Table 9.

TABLE 9

| Operating conditions | Value Synthesis 1 | Unit | Reactor |
|---|---|---|---|
| Number of reactors | 2 | — | — |
| Volume of the reactors | 32.5 | l | 1 |
|  | 32.5 |  | 2 |
| % Styrene (1) | 35 | % | — |
| % by weight of monomers (2) | 13 | % | 1 |
| Polar agent (tetrahydrofurfuryl ethyl ether) | $3.2 \times 10^{-7}$ | mol/m$^3$ | 2 |
| Active initiator (n-butyllithium) | $7.2 \times 10^{-7}$ | mol/m$^3$ | 2 |
| Residence time | 30 | min | 2 |
| Temperature | 35 | ° C. | 1 |
| Temperature | 52 | ° C. | 2 |
| Solvent reinjection (3) | 10 | % | 2 |
| Butadiene reinjection (4) | 15 | % | 2 |
| Conversion by weight of monomers (5) | 43.2 | % | 1 |
|  | 81.3 | % | 2 |
| Coupling agent/living polymer molar ratio | 0.55 | — | Reactor 2 outlet |

(1) by weight, with respect to the sum of all the inputs by weight of monomers of the process
(2) by weight, with respect to the sum of all the inputs by weight of the process
(3) by weight, with respect to the sum of all the inputs of solvent of the process
(4) by weight, with respect to the total weight of the monomers injected into all of the reactors
(5) overall conversion by weight in the reactor The characteristics of the polymers obtained at the outlet of the reactor 2 are given in Table 10.

TABLE 10

|  | Synthesis 1 | Unit |
|---|---|---|
| Vinyl content (6) | 50.6 | % |
| Styrene content (7) | 31.8 | % |
| Tg | −22.7 | ° C. |
| M$_n$ | 115 100 | kg/mol |
| PI | 1.52 | — |
| Viscosity polymerization outlet | 1.41 | dl/g |

(6) by weight of the total weight of the butadiene units introduced into all of the reactors
(7) by weight of the total weight of all of the monomers introduced into all of the reactors The viscosity at the outlet of the functionalization device is 1.89 dl/g. The jump in viscosity, defined as the ratio of the "final" viscosity at the functionalization outlet to the "initial" viscosity at the end of polymerization of greater than 1, shows that there is coupling of the polymer chains of reduced PI.

The invention claimed is:

1. A process for the continuous synthesis of a modified diene elastomer comprising at least one silicon atom directly connected to the elastomer chain, comprising:
   a) a stage of polymerization by means of n reactors r1 to rn which are equipped with an internal stirring system, which are assumed perfectly stirred and which are arranged in series, n varying from 2 to 15, the reactor r1 being fed by an input solution comprising a solvent, one or more monomers, an anionic polymerization initiator and a polar agent, one or more of the reactors r2 to rn additionally being fed by reinjection of a purified solution comprising solvent and/or monomer(s), the purity of the or of each reinjected solution being such that the proportion of the number of dead chains in the output stream from the reactor rn is less than 30%, of the number of living chains initiated in the reactor r1, the temperature of each reactor varying from 20° C. to 150° C., and being greater than or equal to the temperature of the reactor which immediately precedes it, the temperature of the reactor rn being greater than the temperature of the reactor r1, the amount by weight W1 of monomer(s) introduced into the reactor r1 being such that:

$$0.1 < \frac{W1}{\sum_{i=1}^{n} Wi} \leq 1$$

the amount by weight Wi' of monomer(s) reinjected into the reactor ri', when Wi'≠0, i' varying from 2 to n, being such that:

$$0 \leq \frac{Wi'}{\sum_{1}^{n} Wi} < 0.9$$

and such that Wi' represents from 5% to 100% by weight of the weight of the solution reinjected into the reactor ri', when Wi' 0, where Wi is the amount by weight of monomer(s) introduced into the reactor ri, i varying from 1 to n, the amount by weight of all of the monomers entering the reactors r1 to rn representing from 5% to 25% by weight of the sum of the total inputs by weight of the reactors r1 to rn, the overall conversion by weight Ci" in each reactor ri" being such that:

$$\frac{Cn}{n} - 0.2 < \frac{Ci''}{i''} < \frac{Cn}{n} + 0.2$$

where $$Ci'' = \frac{Pi''}{\sum_{1}^{n} Wi}$$

where Pi" is the weight of polymer formed at the outlet of the reactor ri", i" varying from 1 to n−1, and Cn is the overall conversion by weight in the reactor rn, with $$Cn = \frac{Pn}{\sum_{1}^{n} Wi}$$

where Pn is the weight of polymer formed at the outlet of the reactor rn, b) a stage of modification of the living diene elastomer obtained in the preceding stage and exhibiting a polydispersity index varying from 1.1 to 2 by means of at least one functionalization, coupling or star-branching agent, which makes it possible to introduce, into the elastomer, a functional group comprising at least one silicon atom directly connected to the elastomer chain.

2. A process according to claim 1, wherein n=2.

3. A process according to claim 1, wherein the or each constituent of the reinjected solution(s) is, before reinjection, purified independently by adsorption, liquid/liquid extraction, gas/liquid extraction or distillation.

4. A process according to claim 3, wherein the residues from the process(es) for the purification of the or each constituent are reinjected into the input solution feeding the first reactor.

5. A process according to claim 1, wherein the functionalization, coupling or star-branching agent which makes it possible to introduce, into the elastomer, a functional group comprising at least one silicon atom directly connected to the elastomer chain is at least one cyclic polysiloxane corresponding to the formula 1:

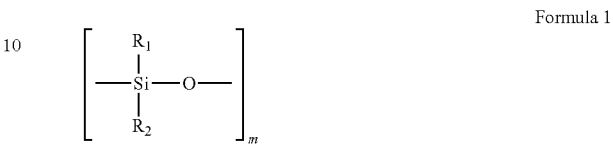

Formula 1 with m represents an integer with a value ranging from 3 to 8, and R1 and R2, which are identical or different, represent an alkyl radical of 1 to 10 carbon atoms.

6. A process according to claim 1, wherein the functionalization, coupling or star-branching agent which makes it possible to introduce, into the elastomer, a functional group comprising at least one silicon atom directly connected to the elastomer chain is at least one compound corresponding to the formula 2:

$$SiR1_p(OR')_{4-p-q}(R3-X)_q,$$

in which:

R3 is a saturated or unsaturated, cyclic or non-cyclic, divalent $C_1$-$C_{18}$ aliphatic hydrocarbon radical or divalent $C_6$-$C_{18}$ aromatic hydrocarbon radical;

X is a hydrogen atom or a functional group capable of interacting with a reinforcing filler;

the R' radicals, which are substituted or unsubstituted and identical or different, represent a $C_1$-$C_{10}$ alkyl group;

the R1 radicals, which are substituted or unsubstituted and identical or different, represent a $C_1$-$C_{10}$ alkyl group;

p represents an integer with a value ranging from 0 to 2 and q represents an integer with the value 0 or 1, with the proviso that p+q≤2.

7. A process according to claim 6, wherein the functionalization, coupling or star-branching agent does not comprise another functional group than that comprising the silicon atom of alkoxysilane type.

8. A process according to claim 6, wherein the functionalization agent of formula 2 comprises a functional group supplementary to that comprising the silicon atom, comprising at least one heteroatom chosen from N, S, O or P.

9. A process according to claim 8, wherein the supplementary functional group is a protected or unprotected primary amine, a protected or unprotected secondary amine or a tertiary amine which is cyclic or non-cyclic, an isocyanate, an imine, a cyano, a protected or unprotected thiol functional group, a carboxylate, an epoxide or a protected or unprotected primary phosphine, a protected or unprotected secondary phosphine or a tertiary phosphine.

10. A process according to claim 9, wherein the supplementary functional group is an amine chosen from (3-N,N-dialkylaminopropyl)trialkoxysilanes, (3-N,N-dialkylaminopropyl)alkyldialkoxysilanes, (3-alkyltrimethylsilylaminopropyl)trialkoxysilanes, (3-alkyltrimethylsilylaminopropyl)alkyldialkoxysilanes, (3-bistrimethylsilylaminopropyl)trialkoxysilanes or (3-bistrimethylsilylaminopropyl)alkyldialkoxysilanes, the alkyl groups being methyl or ethyl and the alkoxy groups being methoxy or ethoxy.

11. A process according to claim 9, wherein the supplementary functional group is a protected or unprotected thiol functional group chosen from (S-trialkylsilylmercaptopropyl)trialkoxysilanes, (S-trialkylsilylmercaptopropyl)alkyldialkoxysilanes, (S-trialkylsilylmercaptoethyl)trialkoxysilanes and (S-trialkylsilylmercaptoethyl)alkyldialkoxysilanes, the alkyl group on the silicon atom bearing the alkoxysilane groups being the methyl or ethyl group, the alkoxy group being the methoxy or ethoxy group and the alkyl group on the silicon bonded to the sulfur atom being the methyl or tert-butyl group.

12. A process according to claim 1 including a complementary stage of coupling or star-branching by means of a coupling or star-branching agent based on tin or silicon derivatives of formula $MR_xX_{4-x}$, in which M represents a Sn or Si atom, x represents an integer with a value from 0 to 2, R represents an alkyl radical of 1 to 10 carbon atoms, and X is a halogen atom.

13. A process according to claim 1, wherein the monomers are butadiene and a vinylaromatic monomer.

14. A process according to claim 1, wherein n is from 2 to 9.

15. A process according to claim 1, wherein the proportion of the number of dead chains in the output stream from the reactor rn is less than 10%.

16. A process according to claim 1, wherein the temperature of each reactor varies from 30° C. to 120° C.

17. A process according to claim 1, wherein the living diene elastomer exhibits a polydispersity index varying from 1.1 to less than 1.7.

18. A process according to claim 1, wherein the living diene elastomer exhibits a polydispersity index varying from 1.2 to 1.6.

19. A process according to claim 5, wherein m represents an integer value of 3.

20. A process according to claim 5, wherein R1 and R2, which are identical or different, represent an alkyl radical having from 1 to 4 carbon atoms.

* * * * *